July 5, 1949.  L. A. BEAUCHEMIN  2,475,539
FORMING DEVICE
Filed Nov. 15, 1946  2 Sheets-Sheet 1
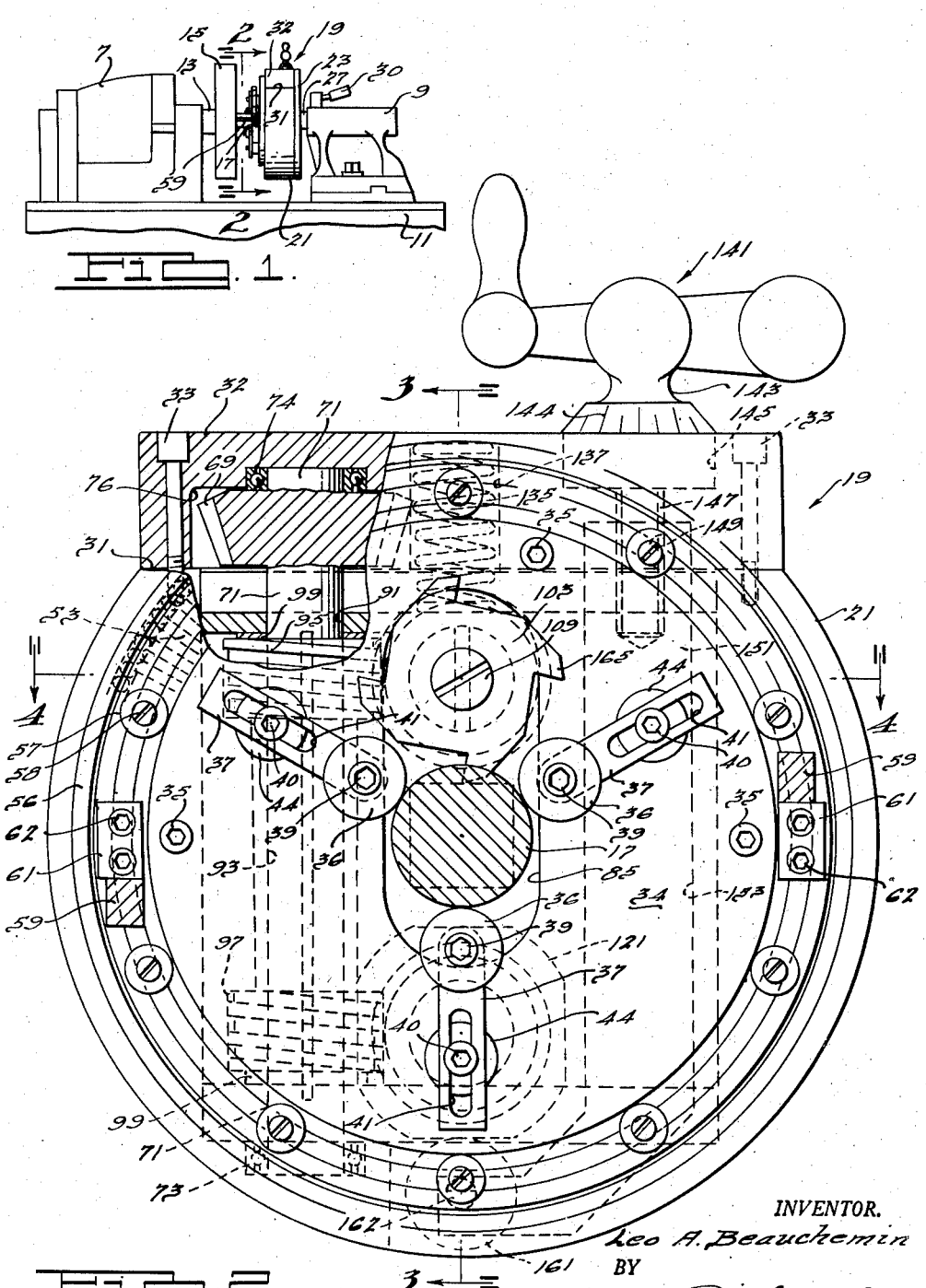
INVENTOR.
Leo A. Beauchemin
BY
Harness, Dickey & Pierce
ATTORNEYS.

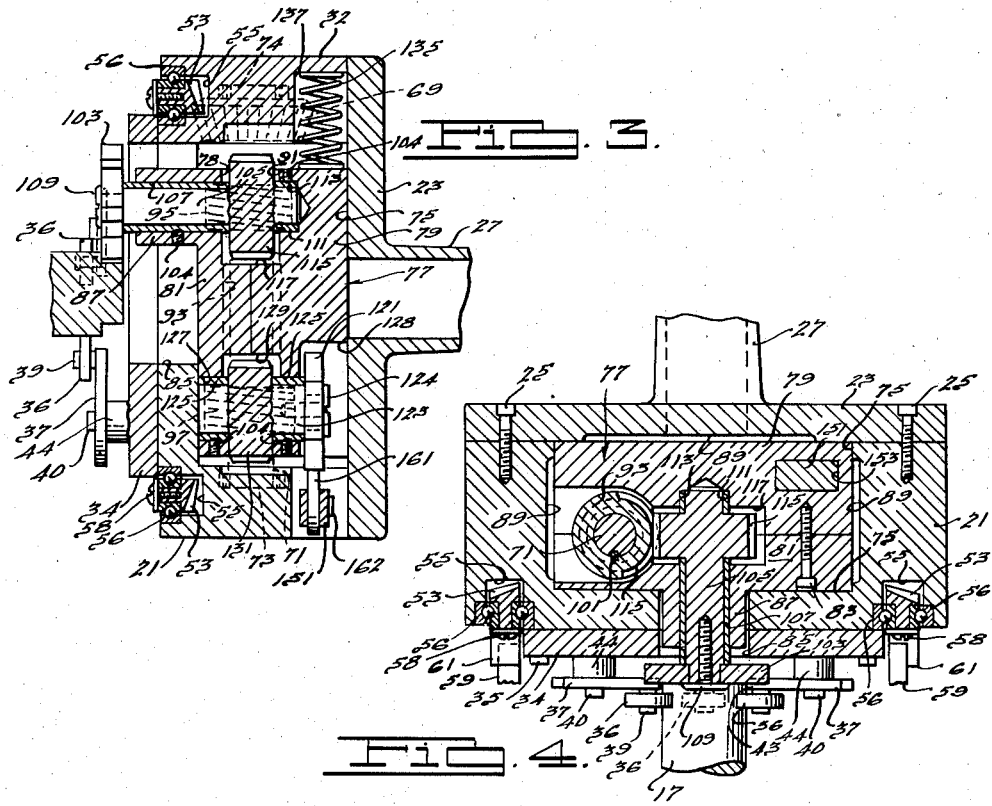

Patented July 5, 1949

2,475,539

UNITED STATES PATENT OFFICE 2,475,539

FORMING DEVICE

Leo A. Beauchemin, Windsor, Ontario, Canada

Application November 15, 1946, Serial No. 709,963

5 Claims. (Cl. 90—11)

This invention relates to forming devices and particularly to a device for forming any desired regular sided figure on a workpiece.

In the past, expensive machinery has been required to form a regular sided figure of different shapes on a workpiece. For example, to form a regular polygon shaped figure such as a triangle, square or hexagon, on a cylindrical workpiece, special machines and index devices have been required and often these have proved inaccurate and cumbersome to use. The device of this invention eliminates these difficulties and provides a simple mechanism which may be attached to an ordinary lathe or like machine.

One object of this invention is to provide a device which will speedily and accurately machine any desired regular polygon shape on a workpiece.

Another object of this invention is to provide a device of the aforementioned type which is inexpensive to manufacture and compact in construction so that it may be attached to an ordinary lathe or like machine.

It is a further object of this invention to provide a device of the aforementioned character which may be quickly and simply adjusted to machine any of the different various regular polygon shapes on a workpiece.

These and other objects of this invention will become more apparent from the following detailed descripiton taken in conjunction with the accompanying drawings in which:

Figure 1 is a side elevational view illustrating the device of this invention mounted on a lathe;

Fig. 2 is a cross-sectional view taken along the line 2—2 of Fig. 1;

Fig. 3 is a cross-sectional view taken along the line 3—3 of Fig. 2;

Fig. 4 is a cross-sectional view taken along the line 4—4 of Fig. 2;

Fig. 5 is a schematic view illustrating the machining of a workpiece to produce one regular sided figure thereon, and Fig. 6 is a schematic view, similar to that illustrated in Fig. 5, showing the forming of a different figure on a workpiece.

Referring now to the drawings, and more particularly to Fig. 1, it will be seen that one particular use of the device of this invention is illustrated. A conventional lathe is provided having a head stock 7 and a tail stock 9 mounted on a base member 11. Extending rearwardly from the head stock 7 is a drive shaft 13 which has a face plate and a collet 15 thereon for receiving and holding a workpiece 17, illustrated in the drawings as a cylindrical bar. The device or attachment embodying this invention, indicated at 19, includes a generally circular shaped hollow housing 21 which has a back plate 23 secured thereto by bolts 25. The back plate 23 has a rearwardly extending tapered shank 27 thereon which is adapted to fit into a tapered recess (not shown) in the tail stock 9 and be rigidly secured therein by a conventional locking member 30. The upper end of the housing 21 is cut off to provide a flat upper surface 31 upon which a rectangularly shaped hollow cap 32 is positioned and secured by bolts 33.

Referring now to Figs. 2, 3 and 4, it will be seen that a front face plate 34 is secured to the front end of the housing 21 by bolts 35. Forwardly of the face plate 34, three radially spaced rollers 36 are provided for supporting and guiding the free end of the workpiece 17. The rollers 36 are rotatably mounted on arms 37 by pins 39, and the arms are secured to the face plate 34 by Allen screws 40 which pass through a slotted aperture 41 adjacent to the opposite end of each arm 37. The arms 37 are spaced forwardly from the face plate 34 by annular collars 44 positioned therebetween and supported on the screws 40. By loosening the Allen screws 40, the rollers and arms can be adjusted to guide and support any size workpiece 17.

A bevel type ring gear 53 is rotatably mounted in an annular channel 55 in the forward face of the housing 21 and cap 32 adjacent to the outer periphery of the front face 34. Bearings 56 are provided within the channel 55 for mounting and supporting the ring gear 53. To prevent any play of the ring gear within the channel 55, a plurality of washers 57 are provided which abut against the front surface of the inner pair of races of the bearings 56 when secured to the ring gear 53 by bolts 58. To drive and rotate the ring gear 53, the lathe face plate 15 is provided with a pair of oppositely disposed dogs 59 which extend therefrom in position to engage lugs 61 extending from the ring gear 53 and secured thereto by bolts 62. In this manner, a driving connection is maintained between the ring gear 53 and the lathe so that when the collet and face plate 15 of the lathe is driven, the ring gear and workpiece 17 held by the collet will be rotated at the same speed. It will be noted that the dogs 59 and lugs 61 are of such a length as to allow limited longitudinal movement therebetween, while maintaining the driving connection, for a reason that will be hereinafter brought out.

A bevel pinion gear 69 is secured to a vertical shaft 71 adjacent to the upper end thereof. The shaft 71 is rotatably supported at its lower end by a thrust bearing 73 which is secured in the lower end of the housing. The upper end of the shaft 71 is rotatably supported in a thrust bearing 74 secured in the cap 32. Immediately below the bearing 74, the cap 32 is recessed as at 76 to receive the pinion gear 69. The teeth of the bevel pinion gear 69 mesh with those of the ring gear 53, and the bevel gear is driven thereby when the ring is rotated by the lathe face plate 15, as pointed out above.

It will be noted, by referring to Figs. 3 and 4, that the housing 21 is formed with a generally rectangularly shaped opening 75 therein which is adapted to receive a carriage, generally indicated at 77. The carriage 77 comprises two plates 79 and 81 which are secured together by bolts 83. It will be noted that the carriage 77 may be inserted into the housing opening 75 through the open rear end thereof when the back plate 23 is removed. The forward or front wall of the housing 21 and the front plate 34 are provided with a vertically elongated aperture 85 which receives a forward projecting boss 87 of the carriage plate 81. The carriage 77 is vertically slidable within the housing 21, and to reduce the friction between the two the housing 21 is provided with indented portions 89 on the inner walls thereof adjacent to the opening 75 so that only a portion of the inner walls of the housing 21 is in contact with the adjacent surfaces of the carriage 77.

It will be noted that the pinion gear shaft 71 passes through a recess 91 in the upper wall of the carriage, as seen in Fig. 2. The lower end of the pinion shaft 71 passes through the lower wall of the carriage 77 and into the housing 21 and the bushings 73, as previously described. Surrounding the shaft 71 and positioned between the upper and lower walls of the carriage 77 and in a recess 78 therein, is a sleeve 93 which carries a worm 95 adjacent to the upper end thereof and a worm 97 adjacent to the lower end thereof. Thrust washers 99 are positioned between the walls of the carriage and the outer faces of the worms 95 and 97 to take up any play between the sleeve 93 and the carriage 77. It likewise will be noted that the sleeve 93 is keyed to the shaft 71 by a key 101, fitting in complementary keyways in the shaft and sleeve. The key 101 provides a driving connection between the shaft 71 and the sleeve and worms. When the ring gear 53 is driven and in turn drives the bevel pinion gear 69 and the shaft 71, the sleeve 93 and its respective worms 95 and 97 may be shifted axially while being rotated at the same speed as the workpiece 17.

A milling cutter 103 is mounted forwardly of the front face plate 34 on the forward end of a shaft 105 which is journaled in a bushing 107 supported in the projecting boss 87 of the carriage plate 81. The forward end of the shaft 105 is formed in the shape of a square which is adapted to be received in a square aperture in the milling cutter 103. The cutter 103 is secured to the end of the shaft 105 by a bolt 109. As seen in Fig. 4, the opposite end of the shaft 105 is journaled in a second bushing 111 which is secured in a recess 113 in the carriage plate 79 in alignment with the bushing 107. In this manner, the shaft 105 is rotatably supported at both ends in the bushings 111 and 107. Setscrews 104 are threadably received in the carriage and engage a notch in the outer wall of each bushing to secure them in position. Intermediate the ends of the shaft, between the bushings 111 and 107, a worm gear 115 is provided, the teeth of which mesh with the thread of the worm 95 mounted on the sleeve 93. It will be noted that the carriage 77 is provided with a recess 117 so that the worm gear 115 will be free to rotate within the carriage.

Referring now to Fig. 3, it will be seen that a cam element 121 is secured to the rear end of a shaft 123 by a bolt 124 and that the shaft 123 is journaled in a pair of aligned bushings 125 which in turn are supported in a horizontal aperture 127 formed in the lower end of the carriage 77 in which they are secured by setscrews 104. The lower rear end of the carriage plate 79 is cut back or notched to form a recess 128 between it and the back plate 23. The recess 128 is open at the lower end thereof and provides an area in which the cam 121 can rotate. The carriage plate 79 is recessed at 129 between the bushings 125 to provide clearance for a worm gear 131 secured to the shaft 123 intermediate its ends. The teeth of the gear 131 mesh with the thread of the worm 97 mounted on the lower end of the sleeve 93 for drivingly connecting the cam element 121 to the sleeve 93. The milling cutter 103 and the cam element 121 will be driven at identical speeds so that they may cooperate to form the desired regular polygon shape on the workpiece, as will be more fully hereinafter described.

A coil spring 135 is positioned in a recess 137 in the housing cap 32, with the upper end of the spring 135 abutting against the upper wall of the recess 137 and the lower end abutting against the upper surface of the carriage 77 so as to urge the carriage downwardly at all times. This spring is relatively heavy and forces the milling cutter 103 into engagement with the workpiece 17, with a sufficient pressure to produce a cutting operation.

A feeding mechanism, generally indicated at 141, is provided for feeding the milling cutter 103 into the workpiece 17. The feeding mechanism, as illustrated in Fig. 2, comprises a handle portion 143 which is journaled in a recess 145 in the housing cap 32 and which has a threaded stem 147 extending downwardly therefrom. The threaded stem 147 is threadably received in a recess 149 formed in the upper end of a generally rectangular shaped bar 151 which in turn passes slidably through an aperture 153 in the carriage 77, as illustrated in Fig. 4, into the recess 128 at the lower end of the carriage 77. At its lower end, the bar 151 extends inwardly to a point below the cam element 121 and supports a roller 161 on a pin 162 in engagement with the cam element 121. The diameter of the roller 161 is equal to the diameter of a circle inscribed within the finished workpiece figure and tangent to the sides thereof, for a reason that will be hereinafter brought out.

By actuating the handle 143 of the feed mechanism 141, the bar 151 will be raised or lowered in the housing, and the roller 161 on the end thereof will cause the carriage 77, in which the cam element 121 is mounted, to move upwardly or downwardly, to provide the proper feed for the milling cutter with respect to the workpiece 17. As illustrated in Fig. 2, the handle 143 is provided with an indexed scale 144 so that the rate of feed movement can be accurately calibrated and determined therefrom. The index scale likewise denotes to the operator when the desired size for the workpiece has been reached to make certain that flat sides have been cut on the workpiece. The sleeve 93 and its respective worms 95 and 97 will move up and down with the carriage along with the milling cutter, the cam element, and their respective worm gears, while being driven in synchronism.

The feeder mechanism 141 controls the depth of cut as it permits the carriage and the milling cutter to be moved toward the workpiece 17 by the action of the spring 135. The spring 135 is of sufficient strength to hold the milling cutter 103 against the workpiece 17 to cut in a satisfactory manner.

It should be understood that the workpiece 17 may be fed axially toward the milling cutter 103 instead of having the milling cutter fed toward the workpiece, as previously described. This axial feeding is possible as the dogs 59 overlap the lugs 61 so as to permit substantial relative movement therebetween. Therefore, by axially moving the lathe face plate 15 toward and away from the housing 21 and still maintaining a driving relation therebetween, the portion of the workpiece 17 which is to be shaped, is fed toward the cutter when the cutter is set in a position to take a final cut and is provided with side cutting edges on its teeth.

As illustrated in Figs. 5 and 6, any regular polygon shape may be formed on the workpiece 17, and while only a square and hexagon shape are shown, it is to be understood that any other regular shaped two or more sided figure can be machined. The milling cutter 103 is provided with the same number of teeth 165 as the number of sides that are to be formed on the workpiece 17. It likewise will be noted that the cutting edges of the teeth 165 are disposed substantially on radial lines, but provided with the usual tooth rake and relief necessary for proper cutting with a tool of this type. The cam element 121 is provided with the same number of plane flat surfaces as are to be formed on the workpiece, joined by arcuate portions described on the diameter of the cutter. The speed of rotation of the workpiece 17 and of the milling cutter 103 is the same but in opposite directions, and the radial line on the cutting edges of each tooth 165 will be maintained at all times perpendicular to the surface which is being cut thereby on the workpiece 17 to produce like cutting action and to prevent tearing and gouging of the metal. The diameter of the cam element 121 must be identical with the diameter of the outer periphery of the milling cutter teeth and the diameter of the roller 161 must be equal to the workpiece inscribed diameter, as previously described. Due to the identical size of the roller and inner tangential circle of the workpiece figure, the line of cut on the workpiece will be maintained parallel to the side of the cam in engagement with the roller and therefore will cause the cutter to shape the workpiece in the desired form.

If the roller 161 were of different diameter than the inscribed circle, the rocking of the cam surface to one or the other side of the vertical center line thereof would shift the carriage in a different manner and produce a convex or concave surface instead of a straight line on each side.

The machining of the desired form on the workpiece is accomplished when the lathe is operated to drive the ring gear 53. The respective worm gears on the milling cutter and the cam element are then driven, as previously described, and the roller 161 on the lower end of the feed mechanism bar 151 will cause the entire carriage 77 to move upwardly and downwardly as it follows the contour of the cam element 121. In addition, the roller is progressively lowered to advance the cutter into the workpiece when the tool is fed into the work. In this way, the milling cutter 103 is moved upwardly and downwardly to follow the pattern of the cam element 121 as it is fed into the workpiece or the workpiece is fed into the cutter. As the workpiece 17 is rotating at the same speed as the milling cutter and cam, and is held in a position by the roller guides 36, the milling cutter will form the desired shape on the workpiece.

As previously pointed out, the roller 161 is the same size as the inner tangential circle of the workpiece figure and therefore it controls the final size of the latter. If a larger or smaller size figure is to be formed on the workpiece, the roller size must be changed accordingly.

It is a simple matter to assemble this device or to change the milling cutter, cam element and roller 161, to produce a different shaped figure and a figure of different diameter on the workpiece. The back plate 23 may be removed from the housing 21 and the cam element 121 removed by taking out the bolt 124 and a new cam element inserted in its place. The milling cutter 103 can be changed by merely removing the bolt 109 and the cutter and inserting a new cutter in its place. The roller 161 can be changed at the same time that the cam 121 is changed by removing the pin 162 and placing a different sized roller thereon.

It will thus be seen that this invention provides a simple and easy way to form any desired regular polygon shape on a workpiece. While the device has been shown in combination with a lathe, it will readily appear to one skilled in the art that this device may be attached to any type of suitable machine wherein a workpiece can be rotated in the device.

What is claimed is:

1. A device for forming a regular sided figure on a rotatable workpiece including a housing, rotatable gear means mounted in said housing, a shaft rotatably mounted in said housing, gear means fixedly connected adjacent one end of such shaft and meshing with said rotatable gear means for rotatably driving said shaft, a carriage slidably mounted in said housing and freely receiving said shaft therethrough, a cutter and a cam rotatably mounted in said carriage, means mounted in said carriage slidably and drivingly connected to said shaft for rotatably driving said cam and cutter in timed relation to each other and to said workpiece, and means engaging said cam for shifting said carriage.

2. A device for forming a regular sided figure on a rotatable workpiece including a housing, rotatable gear means mounted in said housing, a shaft rotatably supported in said housing, gear means fixedly connected adjacent one end of said shaft and meshing with said rotatable gear means for rotatably driving said shaft, a carriage slidably mounted in said housing and freely receiving said shaft therethrough, a cutter and a cam rotatably mounted in said carriage, means mounted in said carriage slidably and drivingly connected to said shaft for rotatably driving said cam and cutter in timed relation to each other and to said workpiece, resilient means urging said carriage relative to said workpiece, and a roller engaging said cam for shifting said carriage toward said resilient means, said roller being of a diameter equal to that of an inscribed circle tangent to the sides of the figure to be produced on the workpiece.

3. A device for forming a regular sided figure on a rotatable workpiece including a housing, rotatable gear means mounted in said housing, a shaft rotatably supported in said housing, gear means fixedly connected adjacent one end of said shaft and meshing with said rotatable gear means for rotatably driving said shaft, a carriage slidably mounted in said housing and freely receiving said shaft therethrough, a cutter and a cam rotatably mounted in said carriage, means mounted in said carriage slidably and drivingly connected to said shaft for rotatably driving said cam and cutter in timed relation to each other and to said workpiece, spring means mounted in said housing and acting on said carriage to urge said cutter toward said workpiece, means slidably mounted in said carriage, roller means rotatably mounted on said last named means abutting said cam and positioned at the opposite end of the carriage from said spring, and handle means adjustably connected to the opposite end of said slidable means from said roller and rotatably mounted in said housing to provide a manually operable feed mechanism for shifting said carriage to control the feeding of said cutter into said workpiece.

4. A device for forming a regular sided figure on a rotatable workpiece including a housing, rotatable gear means mounted in said housing, a shaft rotatably supported in said housing, gear means fixedly connected adjacent one end of said shaft and meshing with said rotatable gear means for rotatably driving said shaft, a carriage slidably mounted in said housing and freely receiving said shaft therethrough, a cutter and a cam rotatably mounted in said carriage, means mounted in said carriage slidably and drivingly connected to said shaft for rotatably driving said cam and cutter in timed relation to each other and to said workpiece, spring means mounted in said housing and acting on said carriage to urge said cutter toward said workpiece, means slidably mounted in said carriage, roller means rotatably mounted on said last named means abutting said carriage cam and positioned at the opposite end of the carriage from said spring, and handle means adjustably connected to the opposite end of said slidable means from said roller and turnably mounted in said housing to provide a manually operable feed mechanism for shifting said carriage to control the feeding of said cutter into said workpiece, said cutter having a plurality of teeth thereon the number of which corresponds to the number of sides to be formed on the workpiece and the diameter of the outer periphery of which corresponds to the diameter of said cam element, said cam element having a plurality of plane surfaces thereon the number of which corresponds to the number of sides to be formed on said workpiece so as to shift said cutter corresponding to the desired form to be cut on the end of said workpiece.

5. In a device for forming a regular sided figure on a workpiece, a housing, means on said housing by which it is attached to the tail stock of a lathe in position to receive adjacent the forward face thereof said workpiece which is rotatably driven and supported by the head stock of the lathe, rotatable gear means mounted in said housing, means on said rotatable gear means adapted to be drivingly engaged by means on said lathe to rotate said gear means in said housing, a shaft rotatably supported in said housing, gear means fixedly connected adjacent one end of said shaft and meshing with said rotatable gear means for rotatably driving said shaft, a carriage slidably mounted in said housing and freely receiving said shaft therethrough, a cutter and a cam rotatably mounted in said carriage, means mounted in said carriage slidably and drivingly connected to said shaft for rotatably driving said cam and cutter in timed relation to each other and to said workpiece; and means engaging said cam for shifting said carriage and said cutter toward said workpiece.

LEO A. BEAUCHEMIN.

REFERENCES CITED

The following references are of record in the file of this patent:

UNITED STATES PATENTS

| Number | Name | Date |
|---|---|---|
| 633,108 | Pearson | Sept. 12, 1899 |
| 1,527,208 | Melling | Feb. 24, 1925 |
| 1,531,565 | Melling | Mar. 31, 1925 |
| 1,698,538 | Deutsch | Jan. 8, 1929 |
| 2,393,727 | Aber | Jan. 29, 1946 |